United States Patent
Lukas et al.

[11] Patent Number: 5,864,624
[45] Date of Patent: Jan. 26, 1999

[54] METHOD FOR ACTIVATING AND EXECUTING PROTECTED FUNCTIONS IN A COMMUNICATION SYSTEM

[75] Inventors: Guenter Lukas, Vienna; Friedrich Ramberger, Hennersdorf, both of Austria; Peter Giese, Zorneding; Siegfried Spahl, Puchheim, both of Germany

[73] Assignee: Siemens Aktiengesellschaft, Munich, Germany

[21] Appl. No.: 774,464

[22] Filed: Dec. 30, 1996

[30] Foreign Application Priority Data

Dec. 28, 1995 [DE] Germany ............ 195 49 014.2

[51] Int. Cl.⁶ .................................................. H04L 9/00
[52] U.S. Cl. ........................ 380/25; 380/2; 380/4; 380/9; 380/23; 380/49; 380/59
[58] Field of Search ................. 380/4, 9, 23, 25, 380/28, 49, 50, 59, 2

[56] References Cited

U.S. PATENT DOCUMENTS

| | | | |
|---|---|---|---|
| 5,103,478 | 4/1992 | Matyas et al. | 380/25 |
| 5,247,577 | 9/1993 | Bailey et al. | 380/23 |
| 5,526,428 | 6/1996 | Arnold | 380/25 |
| 5,651,068 | 7/1997 | Klemba et al. | 380/25 |
| 5,742,683 | 4/1998 | Lee et al. | 380/23 |
| 5,748,739 | 5/1998 | Press | 380/25 |

FOREIGN PATENT DOCUMENTS 43 06 054 A1  9/1993  Germany.

*Primary Examiner*—Bernarr E. Gregory
*Attorney, Agent, or Firm*—Hill & Simpson

[57] ABSTRACT

In a communication system having a function or performance feature to be protected, the periodic transmission of encoded interrogation information is initiated by a security routine to ensure that the function or performance feature is protected. The protected function is activated and further-executed only if reply information which is also encoded is received from a connected crypto-unit in a predetermined time span after a transmission of the interrogation information.

11 Claims, 1 Drawing Sheet

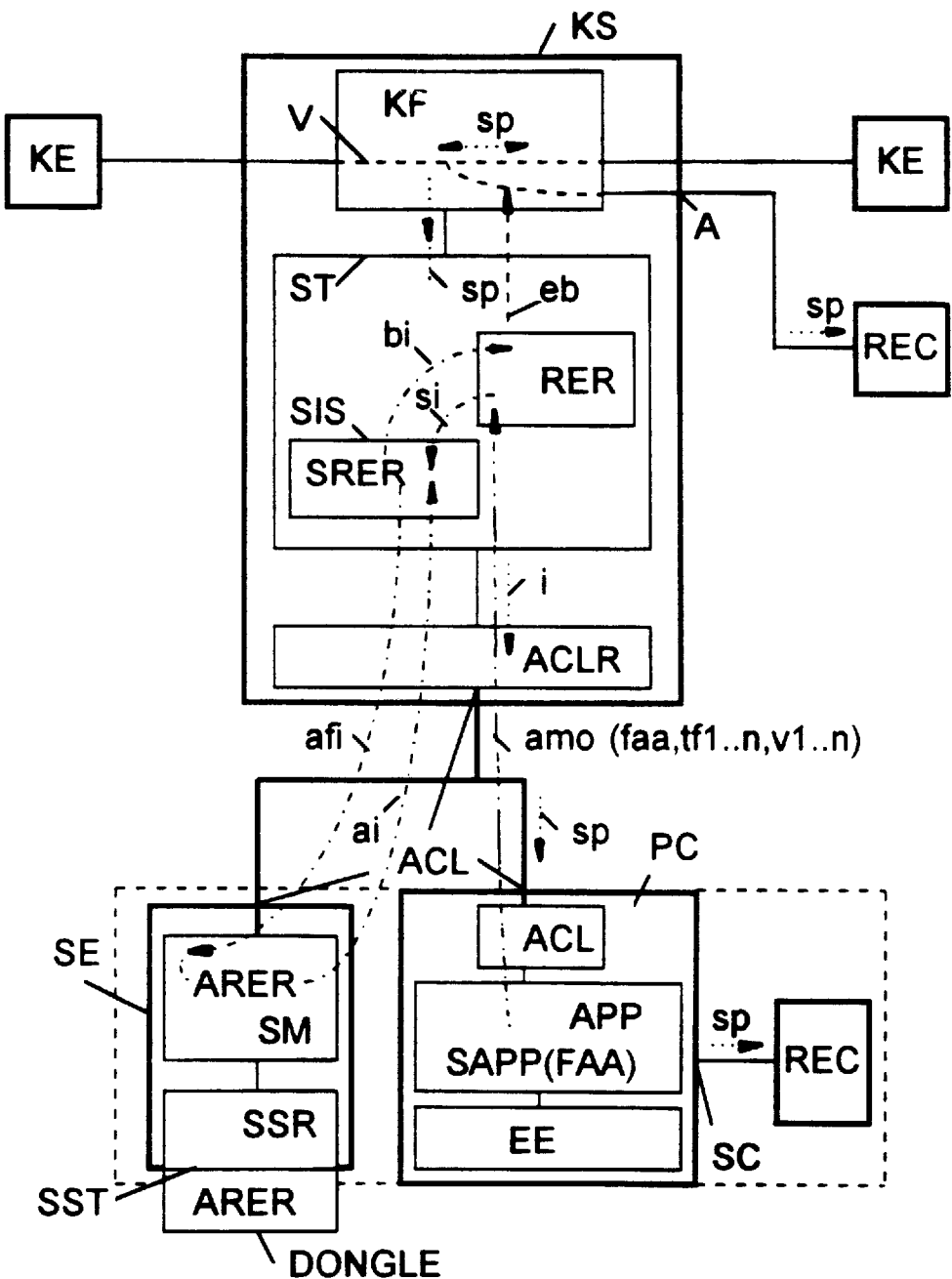

METHOD FOR ACTIVATING AND EXECUTING PROTECTED FUNCTIONS IN A COMMUNICATION SYSTEM

BACKGROUND OF THE INVENTION

1. Field of the Invention

The present invention is generally directed to the field of telecommunication systems and, more particularly, the present invention is directed to a method for activating protected functions in a communication system which has peripheral equipment connected to the communication system.

2. Description of the Related Art

Peripheral equipment, such as, for example servers, are connected to communication systems to provide for easy switching of calls for connected communication terminal equipment incoming at the communication systems of a communication network and for the activation of performance features.

For example, an ACL interface (application connectivity link) present in both equipment locations controls the communication exchange between the communication system and the peripheral equipment. In the communication system, a central controller comprises a program structure which reports switching-oriented events of incoming calls to the peripheral equipment with event messages. The peripheral equipment executes switching-oriented and administration and maintenance oriented instructions communicated via the ACL interface. The switching-oriented and administration and maintenance oriented instructions initialize and control the functions and performance features in the communication system.

These communication systems include functional capabilities and performance features which clearly should be activated and executed only by authorized persons. For example, these features include overriding communication connections that already exist or logging, i.e. recording information communicated via a particular communication connection. The activation and control of these functions thereby proceeds with the peripheral equipment via the ACL interface.

SUMMARY OF THE INVENTION

One object underlying the present invention is to prevent the unauthorized activation and execution of specific functions or performance features of a communication system by the peripheral equipment via the ACL interface.

An exemplary embodiment of the inventive method employs function-dependent crypto-algorithms which are stored in a crypto-unit associated with the communication system. Protected functions and secure routines are activated in the communication system by administration and maintenance instructions communicated from the peripheral equipment. Encoded interrogation information which can be associated with specific functions is communicated to the crypto-unit at least temporarily, and preferably periodically by the activated security routine. The protected function is initiated and executed only if the proper reply information, which is also encoded and preferably function-specific, is received by the security routine from the crypto-unit within a predetermined time span after each transmission of the interrogation information.

As a result of the temporary and preferably periodic transmission of encoded interrogation information, and the corresponding reception of encoded reply information within a predetermined time span after the transmission of the interrogation information, it can be assured that a protected function or feature can be activated and executed only by authorized peripheral equipment or persons. The administration and maintenance instruction which activates a protected function is formed in a protected function located in the peripheral equipment. It is stored thereat and is fetched or is input at an input means of the peripheral equipment.

The administration and maintenance instruction advantageously also comprises administration and maintenance information by which sub-functions present in the communication system in program-oriented terms are operated for the purpose of establishing a protected function. The protected function or performance feature is thereby set up only when activated by program-oriented operation of sub-functions already present in the communication system. For example, the protected function or performance feature cannot be used before this protected setup. Further protection of functions or, respectively, performance features that dare not be used by unauthorized persons is thereby achieved.

The predetermined time span is matched to the processing and communication times of the communication system and the peripheral equipment as well as the crypto-unit.

On the one hand, the predetermined time span should not be shorter than the sum of all processing and transmission times for the transmission of interrogation information and formation and transmission of reply information. Conversely, it should not exceed a selected, maximum time span.

According to another advantageous aspect of the present invention, the crypto-programs that realize the determination of the function-associated keys and formation of reply information in the crypto-unit can only be activated by a circuit-oriented program execution protection. The circuit-oriented program execution protection is desirably plugged in at an interface of the crypto-unit and effects the activation of the crypto-programs with an interface routine connected to the interface. This circuit-oriented program execution protection—known in the field as hardware dongle—additionally increases the security with respect to the unauthorized use of specific functions or performance features.

Advantageously, the peripheral equipment is connected to the communication system via an ACL interface and the crypto-unit is advantageously integrated into the peripheral equipment. For example, the crypto-unit may be integrated in the peripheral equipment which in a preferred embodiment is realized by a personal computer. In such an embodiment, one of the existing interfaces of the personal computer may be used for plugging in the circuit-oriented program execution protection.

DESCRIPTION OF THE DRAWINGS

The inventive method and system is explained in greater detail below with reference to the drawings wherein:

FIG. 1 is a block diagram illustration of a preferred embodiment of the present invention.

DETAILED DESCRIPTION OF THE PREFERRED EMBODIMENTS

FIG. 1 is a block circuit diagram which illustrates a communication system KS to which communication terminal equipment units KE are connected. By way of example, two communication terminal equipment units KE are shown that are connected via a switching network KF arranged in the communication system KS—indicated by broken lines in the switching network KF. The connection between the illustrated communication terminal equipment KE is constructed according to a signaling procedure, such as, for example, a known ISDN signaling procedure, with the assistance of a central controller ST that is primarily program-oriented.

The communication system comprises a central control means ST that controls and coordinates the system in switching-oriented terms and also comprises an ACL routine ACLR that provides an ACL interface (application connectivity link). The switching network KF and the ACL routine ACLR are respectively connected to the central controller ST. The ACL interface of the CL routine ACLR is respectively connected to an identically realized ACL interface CL of a personal computer PC and to a crypto-unit SE. The personal computer PC represents a peripheral equipment of the communication system KS in which application programs APP are stored for controlling additional functions and performance features of the communication system. These may include such things as, for example, ACD (automatic call distribution). The functions and performance features realized in the communication system KS are activated or initiated by the respective applications programs APP with switching-oriented or administration and maintenance instructions amo. A program structure—monitoring program (not shown)—with which all switching-oriented events and potentially communicated information sp are acquired and forwarded to the personal computer is provided in the central controller for displaying switching-oriented events and information sp communicated via the connection.

It may be assumed that during operation of the exemplary embodiment, a protected function such as FAA, for overriding a connection between two terminal equipment units KE and recording the communicated information sp is activated by an application program SAPP and that this function is to be executed. To this end, the applications program SAPP communicates an administration and maintenance instruction amo with information faa which indicates the protected function FAA is to be activated to the central controller ST via the ACL interface ACL. As a result, the central controller ST sets up a recording routine RER. The recording routine RER is set up in the central controller according to the particulars about sub-functions tf1 . . . n and operation information v1 . . . n additionally communicated in the administration and maintenance instruction amo. The sub-functions already implemented in the communications system KS as well as their connection to one another are recited by these additional information tf1 . . . n, v1 . . . n. Advantageously, the information tf1 . . n, v1 . . . n can be indicated in a table in the administration and maintenance instruction amo.

After setup of the recording routine RER, a start information si is communicated to a security routine SIS realized in the central controller ST. Encoded interrogation information afi are formed in this security routine SIS dependent on the function or, respectively, performance feature to be activated. A correspondingly separate key (not shown) is deposited for each function or performance feature which is to be protected. With reference to the exemplary embodiment, the key SRER is stored in the security routine SIS and provided for performance feature override and recording and by re the routine RER thereby realizing the performance feature FM.

The interrogation information afi encoded with the function-associated key SRER is communicated via the ACL interface ACL to the crypto-module SM located in the crypto-unit SE. The communicated interrogation information afi is encoded again with a function-specific key ARER in the crypto-module SM and sent back to the security routine SIS as reply information ai. The function-specific key ARER differs for the respective functions or, respectively, performance features to be protected and is introduced into the crypto-unit SE by a circuit-oriented executive protection DONGLE. This inputting ensues by plugging the circuit-oriented program execution protection DONGLE to an interface SST of the interface unit SE. The interface SST realized by an interface routine SSR is connected to the crypto-module SM. With every incoming interrogation information afi, the key ARER is interrogated from the circuit-oriented program execution protection DONGLE and forwarded to the crypto-module with the assistance of the interface routine SSR. The communicated interrogation information afi is encoded again with this function-specific key ARER and returned to the security routine SIS as reply information ai.

When the circuit-oriented program execution protection DONGLE is not plugged in or is removed, a first-time or further encoding of the received interrogation information afi is no longer possible. The interrogation information afi is thus sent back unencoded (assumed below for the exemplary embodiment) or, alternatively, is no longer sent back.

The communicated reply information ai is checked in the security routine SIS of the communication system KS to see whether the interrogation information afi that was sent has been correctly encoded, i.e. with the corresponding function-specific key ARER—for the performance FAA feature of overriding and recording in the exemplary embodiment. Given correctly communicated reply information ai, an acknowledgment information bi is formed and communicated to the established recording routine RER. As a result of the received acknowledgment information bi, the recording routine RER forms a setting command eb and communicates it to the switching network KF. The switching network effects the connection of an additional subscriber terminal A to the connection V that already exists between the communication terminal equipment KE—indicated by broken lines.

For example, a recording means REC that automatically records the information sp when they are present is connected to this additional subscriber terminal A. Alternatively, the recording means REC is connected to an interface SC of the personal computer PC. The information sp communicated between the two communication terminal equipment KE are thereby communicated to the recording means REC via the recording routine RER and the ACL interface ACL as well as the corresponding application program SAPP and via the interface SC. Alternatively, the recording means REC can be integrated in the personal computer PC—indicated by broken lines—, whereby existing memory devices of the personal computer PC can be co-utilized.

An unallowed or, respectively, unauthorized access onto the ACL interface ACL must be avoided during the recording, i.e. during operation, particularly when there is recording of the communicated information sp at the personal computer PC. To this end, the security routine SIS forms an interrogation information afi periodically, i.e. at predetermined time intervals of, for example, five seconds, and transmits it, and a correctly encoded reply information ai is expected within a predetermined time span, for example 3 seconds. When this additionally encoded reply information ai fails to arrive, the recording procedure is immediately interrupted and the recording routine RER that has been set up is deleted. It will be recognized that the period duration, i.e. the time duration between the respective transmission of interrogation information afi, and the reply duration, i.e. the duration within which an additionally encoded reply information ai must be received after the transmission of an interrogation information afi, is to be adapted to the respective processing and transmission times in the communication system KS, the crypto-unit SE as well as the trunks between the ACL interfaces ACL.

The administration and maintenance instruction amo for activating and establishing a protected function or performance feature, can be alternatively formed by an input means, for example a keyboard, of the personal computer and subsequently communicated to the communication system via the ACL interface ACL. Significant security against unallowed activation of protected functions or performance features is achieved both by the specific, i.e. user-specific, input by the input means EE of the personal computer as well as by the circuit-oriented program execution protection DONGLE.

Additional security is achieved in that the crypto-unit SC is connected, i.e., for example, plugged, to the ACL interface ACL by an authorized person shortly before activation and execution of protected functions or performance features. This connection of the crypto-unit SE can also take place at a line unit of, for example, an existing plug device of the personal computer, whereby this connection in the personal computer PC assumes an integration of an additional SCL interface ACL. The crypto-unit SE can also be permanently inserted between the two ACL interfaces of the personal computer PC and the communication system KS, whereby the security is achieved, for example, by a plugable circuit-oriented program execution protection DONGLE.

The present invention is subject to many variations, modifications and changes in detail. It is intended that all matter described throughout the specification and shown in the accompanying drawings be considered illustrative only. Accordingly, it is intended that the invention be limited only by the spirit and scope of the appended claims.

We claim as our invention:

1. A method for selectively authorizing access to functions in a communication system having peripheral equipment connected to the communication system, comprising the steps of:

storing a crypto-algorithm in a crypto-unit associated with the communication system;

transmitting an instruction from the peripheral equipment to activate a protected function in the communication system;

transmitting function encoded interrogation information to the crypto-unit; and terminating the protected function if proper reply information is not received within a predetermined time span after transmission of the interrogation information.

2. A method according to claim 1, wherein the instruction is formed in a protected application in the peripheral equipment or in an input means associated with the peripheral equipment.

3. A method according to claim 1, wherein the instruction additionally comprises information with which sub-functions of the communication system are operated for the purpose of establishing the protected function.

4. A method according to claim 3, wherein additional information formed by the protected application is entered in a table with reference to at least one sub-function which realizes the protected function.

5. A method according to claim 1, wherein the interrogation information is periodically communicated to the crypto-unit.

6. A method according to claim 1, wherein the predetermined time span is matched to a processing and transmission time of the communication system.

7. A method according to claim 1, wherein the protected function is a switching function.

8. A method according to claim 1, wherein the crypto-programs are activated in the crypto-unit by a program executive protection.

9. A method according to claim 8, wherein the program executive protection is plugged to an interface of the crypto-unit.

10. A method according to claim 1, wherein the peripheral equipment is connected to the communication system via an ACL interface.

11. A method according to claim 1, wherein the crypto-unit is integrated in the peripheral equipment.

* * * * *